United States Patent
Sasaki et al.

(10) Patent No.: US 7,564,214 B2
(45) Date of Patent: Jul. 21, 2009

(54) BATTERY PACK, CHARGING CONTROL METHOD, AND APPLICATION DEVICE

(75) Inventors: Taichi Sasaki, Fukushima (JP);
Masahiko Hayakawa, Fukushima (JP);
Dai Sasaki, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 183 days.

(21) Appl. No.: 11/291,133

(22) Filed: Nov. 30, 2005

(65) Prior Publication Data

US 2006/0119316 A1 Jun. 8, 2006

(30) Foreign Application Priority Data

Dec. 2, 2004 (JP) .......................... P2004-349749

(51) Int. Cl.
*H02J 7/00* (2006.01)
(52) U.S. Cl. ...................................... 320/106; 320/110
(58) Field of Classification Search ................. 320/106, 320/107, 127, 132, 134, 136, DIG. 12, DIG. 13, 320/DIG. 21, 110, 111; 307/34, 35, 39, 40, 307/51, 52; 713/160, 161, 166; 340/636.1
See application file for complete search history.

(56) References Cited

U.S. PATENT DOCUMENTS

| | | | |
|---|---|---|---|
| 5,654,623 A | | 8/1997 | Shiga et al. |
| 5,801,514 A | * | 9/1998 | Saeki et al. .................. 320/136 |
| 6,445,162 B1 | * | 9/2002 | Mukainakano ............... 320/132 |
| 6,646,422 B2 | * | 11/2003 | Hogari et al. ................ 320/134 |
| 6,664,764 B1 | * | 12/2003 | Odaohhara .................... 320/132 |
| 6,975,092 B2 | * | 12/2005 | Edington et al. ............. 320/106 |
| 2002/0101218 A1 | | 8/2002 | Koenck et al. |
| 2003/0020434 A1 | * | 1/2003 | Fukuoka et al. ............. 320/134 |
| 2003/0184263 A1 | * | 10/2003 | Nishida et al. .............. 320/132 |
| 2004/0256452 A1 | * | 12/2004 | Coughlin et al. ............ 235/380 |
| 2005/0127868 A1 | * | 6/2005 | Calhoon et al. ............. 320/108 |

FOREIGN PATENT DOCUMENTS

| GB | 2396261 A | * | 6/2004 |
|---|---|---|---|
| JP | 2004-147408 | | 5/2004 |

OTHER PUBLICATIONS

WO 99/00863 Demuro,Battery charging system having lock-out circuitry,Jan. 7, 1999, WIPO, pp. 2-4.*

* cited by examiner

*Primary Examiner*—Akm E Ullah
*Assistant Examiner*—M'Baye Diao
(74) *Attorney, Agent, or Firm*—K&L Gates LLP

(57) ABSTRACT

A battery pack having a secondary battery and a circuit that controls charging and discharging of the secondary battery is provided. The battery pack has a computer that communicates with another computer disposed in a charging device, authenticate the charging device, and calculates remaining capacity information of the secondary battery. When the computer has not successfully authenticated the charging device and has detected that the secondary battery has been charged in a predetermined manner, the computer forcibly sets the remaining capacity information to "no remaining capacity".

10 Claims, 4 Drawing Sheets

BATTERY PACK, CHARGING CONTROL METHOD, AND APPLICATION DEVICE

CROSS REFERENCES TO RELATED APPLICATIONS

The present application claims priority to Japanese Patent Application JP 2004-349749 filed in the Japanese Patent Office on Dec. 2, 2004, the entire contents of which is being incorporated herein by reference.

BACKGROUND

The present invention relates to a battery pack and a charging control method that allow the battery pack to authenticate a charging device and prevent the charging device from charging the battery pack when the charging device is not an authorized charging device.

Since a secondary battery, for example a lithium ion battery, has features of small size, light weight, high energy density, high output, and so forth, it has been widely used for power supplies of application devices such as a digital camera, a cellular phone, a portable personal computer, and so forth. Such a lithium ion battery needs to be charged by a charging device manufactured by an authorized manufacturer to secure safe use of the battery and prevent the battery life from decreasing. For example, an unauthorized charging device may not satisfy necessary specifications. If the battery is charged by such an unauthorized charging device, the battery may be overcharged.

The following patent document 1 describes a related art reference of which a battery pack and an application device authenticate each other to prevent an authorized battery pack from being used.

Patent Document 1 Japanese Patent Laid-Open Publication No. 2004-147408.

In the related art reference described in the patent document 1, a microcomputer disposed in a camcorder as an application device and a microcomputer disposed in a battery pack authenticate each other. According to the authenticated results, a power supply line of the camcorder is turned on or off. In the related art reference described in the patent document 1, the camcorder is prohibited from using a forged battery pack that unlikely satisfies the specifications of the camcorder. In other words, the related art reference described in the patent document 1 does not intend to prevent an unauthorized charging device from charging an authorized battery pack.

SUMMARY

In view of the foregoing, it would be desirable to provide a battery pack, a charging control method, and an application device that allow the battery pack to be prevented from being charged by an unauthorized charging device.

According to an embodiment of the present invention, there is provided a battery pack having a secondary battery and a circuit that controls charging and discharging of the secondary battery. The battery pack has a computer that communicates with another computer disposed in a charging device, authenticates the charging device, and calculates remaining capacity information of the secondary battery. When the computer has not successfully authenticated the charging device and has detected that the secondary battery has been charged in a predetermined manner, the computer forcibly sets the remaining capacity information to "no remaining capacity".

According to an embodiment of the present invention, there is provided a charging control method of a battery pack having a secondary battery, a circuit that controls charging and discharging of the secondary battery, and a computer that calculates remaining capacity information of the secondary battery. The computer communicates with another computer disposed in a charging device and authenticates the charging device. It is detected that the secondary battery has been charged in a predetermined manner when the charging device has not been successfully authenticated. The remaining capacity information is forcibly set to "no remaining capacity" when it has been detected that the secondary battery has been charged in the predetermined manner.

According to an embodiment of the present invention, there is provided an application device to which a battery pack is attached as a power supply, the application device receiving remaining capacity information from the battery pack, the remaining capacity information being detected by the battery pack, wherein while the battery pack is supplying a power to the application device, when the application device receives the remaining capacity information that has been forcibly set to "no remaining capacity", the application device stops its operation.

According to an embodiment of the present invention, since the battery pack is prevented from being charged by an unauthorized charging device, the safety of the battery pack can be improved. In addition, the deterioration of the performance of the battery pack, such as a decrease of the battery life, due to the use of an unauthorized charging device can be prevented. Thus, the reliability of the battery pack can be improved. In addition, unauthorized charging devices that are dangerous for the battery pack can be kept out from the market. Moreover, according to an embodiment of the present invention, software prevents unauthorized charging devices from being used, it is not necessary to change hardware of the battery pack.

Additional features and advantages are described herein, and will be apparent from, the following Detailed Description and the figures.

DETAILED DESCRIPTION

Figure 1:
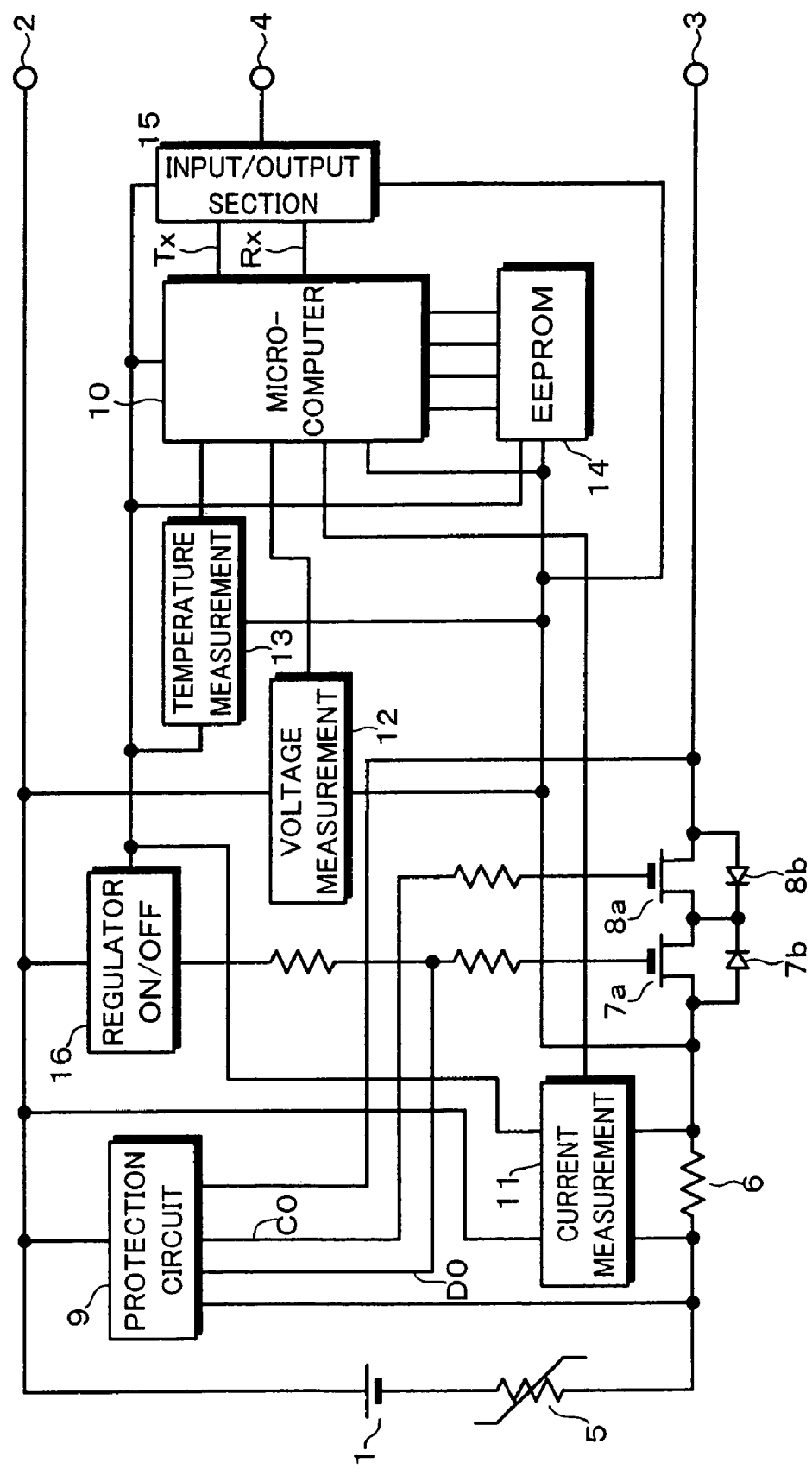
FIG. 1 is a schematic diagram showing circuitry of a battery pack according to an embodiment of the present invention.

Next, with reference to the accompanying drawings, embodiments of the present invention will be described. FIG. 1 shows a battery pack according to an embodiment of the present invention. In FIG. 1, reference numeral 1 represents a secondary battery, for example a lithium ion battery. The battery pack has a plus (+) terminal 2, a minus (−) terminal 3, and a communication terminal 4.

A positive electrode of the secondary battery 1 is connected to the plus (+) terminal 2. A negative electrode of the secondary battery 1 is connected to the minus (−) terminal 3 through a current restriction device 5, a current detection resistor 6, a drain and a source of a discharging control field effect transistor (FET) 7a, and a drain and a source of a charging control FET 8a. The current restriction device 5 is for example a positive temperature coefficient (PTC) device. When temperature rises, the resistance of the current restriction device 5 increases and restricts a current that flows. Parasitic diodes 7b and 8b are disposed between the drain and the source of the FET 7a and between the drain and the source of the FET 8a, respectively.

Control signals D0 and C0 are supplied from a protection circuit 9 to the gates of the discharging control FET 7a and the charging control FET 8a, respectively. In the regular charging and discharging operations, the signal levels of the control signals D0 and C0 are high, causing the FETs 7a and 7b to be turned on. The protection circuit 9 has three functions that are an overcharging protection function, an overdischarging protection function, and an overcurrent protection function. Next, these protection functions will be described in brief.

First, the overcharging protection function will be described. When the secondary battery 1 is charged, the battery voltage continues to rise after the secondary battery 1 is fully charged. When the secondary battery 1 is overcharged, it may become dangerous. Thus, the secondary battery 1 needs to be charged with a constant current at a constant voltage. The charging control voltage needs to be the rating voltage or lower of the battery (for example, 4.2 V). However, if the charging device malfunctions or an unauthorized charging device is used, the secondary battery 1 may be overcharged. When the secondary battery 1 is overcharged and the battery voltage becomes a predetermined value or higher, the signal level of the output C0 of the protection circuit 9 is changed from high level to low level, causing the charging control FET 8a to be turned off and the charging current to be shut off. This function is the overcharging protection function. When the charging control FET 8a is turned off, the secondary battery 1 can be only discharged through the discharging control FET 7a and the parasitic diode 8b.

Next, the overdischarging protection function will be described. When the secondary battery 1 is discharged and the battery voltage drops to a rating discharge stop voltage or lower, for example, 2 V to 1.5 V, the secondary battery 1 may malfunction. When the battery voltage drops to a predetermined value or lower, the signal level of the output D0 of the protection circuit 9 is changed from high level to low level, causing the discharging control FET 7a to be turned off and the discharging current to be shut off. This function is the overdischarging protection function. When the discharging control FET 7a is turned off, the secondary battery 1 can be only charged through the charging control FET 8a and the parasitic diode 7b.

Next, the overcurrent protection function will be described. When the plus (+) terminal and the minus (−) terminal of the secondary battery 1 are short-circuited, a large current flows in the secondary battery 1 and may cause it to abnormally heat. If a discharging current that flows exceeds a predetermined value, the signal level of the output D0 of the protection circuit 9 is changed from high level to low level, causing the discharging control FET 7a to be turned off and the discharging current to be shut off. This function is the overcurrent protection function.

Reference numeral 10 represents a microcomputer disposed in the battery pack. A current measurement section 11 detects a current that flows in the current detection resistor 6. A voltage measurement section 12 measures a battery voltage. A temperature measurement section 13 measures the temperature of the secondary battery 1 with a temperature detection device such as a thermistor. The measured values are input to the microcomputer 10.

An electrically erasable and programmable read only memory (EEPROM) 14, which is a nonvolatile memory, is connected to the microcomputer 10. Data input lines, data output lines, clock supply lines, and chip select lines are connected between the microcomputer 10 and the EEPROM 14. The microcomputer 10 calculates remaining capacity information with the current measurement value, the voltage measurement value, and the temperature measurement value. The EEPROM 14 stores the measured values, data necessary to obtain the remaining capacity, for example a table representing the relationship of the battery voltage and remaining power, obtained remaining capacity information, and so forth. The nonvolatile memory may be a random access memory (RAM) that has a backup power supply besides the EEPROM.

The remaining capacity of the secondary battery may be detected by for example the voltage method of which the remaining capacity of the secondary battery is detected by measuring the battery voltage and the cumulation method of which the remaining capacity of the secondary battery is obtained by measuring the voltage and current of the secondary battery and multiplying them.

Since the terminal voltage of the battery cell is measured when the remaining capacity of the secondary battery is detected by the voltage method, the remaining capacity is calculated according to the correlation of the voltage and battery capacity (remaining capacity ratio) of the secondary battery. Thus, when the battery voltage of the lithium ion battery is 4.2 V/cell, it is determined to be fully charged. When the battery voltage is 2.4 V/cell, it is determined to be discharged. As a result, the remaining capacity of the secondary battery can be easily measured.

The cumulation method of detecting the remaining capacity of the secondary battery can be categorized as the current cumulation method of which the current of the secondary battery is measured and cumulated at intervals of a predetermined period and the power cumulation method of which the voltage and current of the secondary battery are measured, they are multiplied, the power is obtained, and the power is cumulated at intervals of a predetermined period. In any method, the discharging current or discharging power of the secondary battery is obtained. According to the ratio of the discharging current or discharging power and the usable current or usable power of the secondary battery, the remaining capacity of the secondary battery is obtained. Thus, the remaining capacity of the secondary battery can be stably obtained without influence of fluctuation of the battery voltage.

When the battery capacity is detected by using the cumulation method and the voltage method together, the accuracy of the obtained battery capacity can be improved. When the current of the secondary battery is lower than a preset value, the voltage method may be used. In contrast, when the current of the secondary battery is higher than the preset value, the current cumulation method may be used. When the battery capacity is measured by selectively using these methods, the calculation accuracy of the battery capacity can be improved. Another detection method of which the remaining capacity ratios detected by the cumulation method and the voltage method are weighted according to the remaining capacity ratio of the secondary battery, the results are added, and a final remaining capacity ratio is detected has been proposed. According to this embodiment, any of these methods can be used.

As the remaining capacity information, specifically, remaining capacity (mAh), remaining capacity ratio (%), and remaining usable time (minute) are calculated. The remaining capacity information is transmitted from the microcomputer 10 to a microcomputer of an application device to which the battery pack is connected. The application device side displays the received remaining capacity information on a display section such as a liquid crystal display. When the remaining capacity information is 0, even if the battery pack is attached to the application device, it does not operate.

According to the embodiment of the present invention, the communication terminal 4 is used to allow the microcomputers to communicate with each other. A transmission signal and a reception signal that have been time-division multiplexed are transmitted through one signal line connected to the communication terminal 4. An input/output section 15 is disposed between the microcomputer 10 and the communication terminal 4. The input/output section 15 for example separates a transmission signal Tx and a reception signal Rx and adjusts the levels of these signals. Instead, independent transmission and reception terminals may be disposed.

In the addition, the battery pack has a regulator 16 that generates a predetermined regulated voltage of for example 2.5 V with the voltage of the secondary battery 1. The voltage generated by the regulator 16 is supplied as a power supply voltage to the microcomputer 10, the current measurement section 11, the temperature measurement section 13, the EEPROM 14, and the input/output section 15.

The control signal D0 supplied from the protection circuit 9 to the gate of the discharging control FET 7a is supplied as an on/off control signal to the regulator 16. In other words, a possibility of overdischarging of the battery pack is detected. The control signal that turns off the discharging control FET 7a turns off the regulator 16. When the regulator 16 is turned off, the output voltage of the regulator 16 becomes 0, causing the circuitry such as the microcomputer 10 that uses the output voltage of the regulator 16 as the power supply voltage to stop. The circuitry of the battery pack prevents the secondary battery 1 from being overdischarged.

Figure 2A:
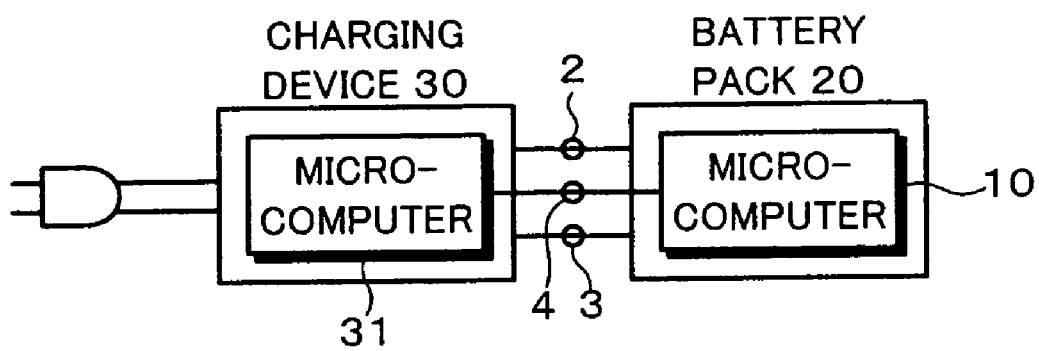
FIG. 2A and FIG. 2B are block diagrams showing an authentication method of structures of a battery pack and a charging device.

Next, with reference to FIG. 2A and FIG. 2B, an example of a connection of the battery pack and the charging device according to an embodiment of the present invention will be described. FIG. 2A shows an example of the structure of which a battery pack 20 is connected to a charging device 30 that rectifies a commercial power and generates a charging power. In FIG. 2A, the charging device 30 has a rectification circuit and a charging circuit (not shown). The battery pack 20 has the same structure as that shown in FIG. 1. In this case, the charging device 30 charges a secondary battery of the battery pack 20. In addition, a microcomputer 31 of the charging device 30 communicates with the microcomputer 10 of the battery pack 20 to mutually authenticate each other.

Figure 2B:
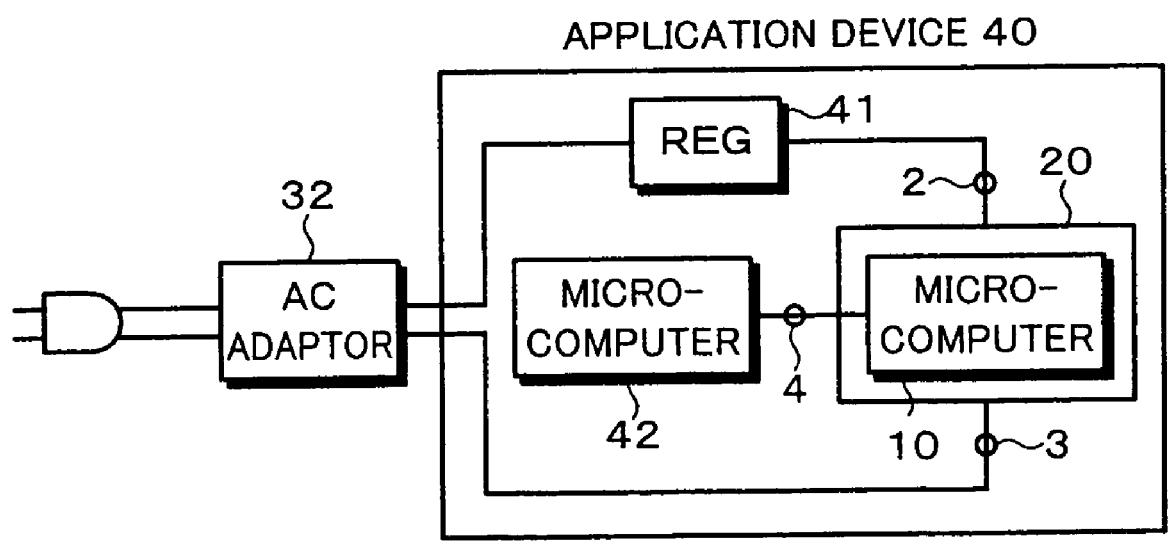

In FIG. 2B, the battery pack 20 is attached to an application device 40. The secondary battery of the battery pack 20 is charged by an AC adaptor 32. In the structure shown in FIG. 2B, the application device 40 and the AC adaptor 32 compose a charging device. The AC adaptor 32 rectifies the commercial power and supplies the rectified power to the application device 40. A regulator 41 disposed in the application device 40 generates a charging power for the secondary battery of the battery pack 20. In this structure, the microcomputer 10 of the battery pack 20 communicates with a microcomputer 42 of the application device 40 to mutually authenticate each other. As a modification of the structure shown in FIG. 2A, the AC adaptor 32 may be connected to a cradle and the AC adaptor 32 may charge the secondary battery of the battery pack 20 of the application device 40 placed in the cradle. In addition, as shown in FIG. 2A, the battery pack 20 charged by the charging device 30 may be attached to the application device 40.

The microcomputer 10 of the battery pack 20 and the microcomputer 31 of the charging device 30 or the microcomputer 42 of the application device 40 are mutually authenticated according to for example the challenge and response system. When the battery pack 20 is attached to the charging device 30 or the application device 40, they are mutually authenticated.

The microcomputer 31 detects whether the battery pack 20 has been attached to the charging device 30 or the application device 40 by reading the content of the EEPROM 14 of the battery pack 20. When predetermined data are returned from the EEPROM 14 in a predetermined time period, the microcomputer 31 determines that the battery pack 20 has been attached. When the predetermined data are not returned from the EEPROM 14 in the predetermined time period, the microcomputer 31 determines that the battery pack 20 has not been attached. Instead, the microcomputer 31 may detect whether the battery pack 20 has been attached detecting a physical connection.

In the challenge and response system, secret information is shared by the charging device (microcomputer 31 or 42; this applies to the following description) and the battery pack (microcomputer 10; this applies to the following description). First, challenge data are transmitted from the charging device to the battery pack. The challenge data are temporary data that are random numbers.

When the battery pack has received the challenge data from the charging device, the battery pack generates response data with own secret information and the challenge data and returns the response data to the charging device. The charging device side performs the same generation process and compares the generated data with the response data. When they match, the charging device determines that the battery pack know the secret information. In other words, the charging device determines that the attached battery pack be an authorized battery pack. Otherwise, the charging device does not successfully authenticate the battery pack and determines that the battery pack is an unauthorized battery pack. The charging device stores the authenticated result.

Next, the authenticating side is changed from the charging device to the battery pack. The authenticated side is changed from the battery pack to the charging device. The charging device generates response data with challenge data received from the battery pack and own secret information and returns response data to the battery pack. The battery pack side generates data in the same generation process and compares the generated data with the received response data. When they match, the battery pack side successfully authenticates the charging device and stores the determined result. In this case, the battery pack determines whether the charging device be an authenticated charging device.

The battery pack returns the authenticated result to the charging device. When both the two authenticated results are satisfied, the charging device determines that the battery pack and the charging device have been mutual authenticated and stores the mutually authenticated result. When the application device as the charging device has not been successfully authenticated, the application device is incapable of using the battery pack. The battery pack on the authenticating side stores the authenticated result of the charging device on the authenticated side. As will be described later, when the battery pack has not been successfully authenticated, the remaining capacity information is forcibly set to "no remaining capacity". According to the embodiment of the present invention, since the remaining capacity information of the battery pack is controlled according to the authenticated results, the battery pack needs to successfully authenticate the charging device. Thus, the battery pack and the charging device do not need to mutually authenticate each other. In addition, the authentication method according to the foregoing challenge response system is just an example. Thus, another authentication method may be used.

Figure 3:
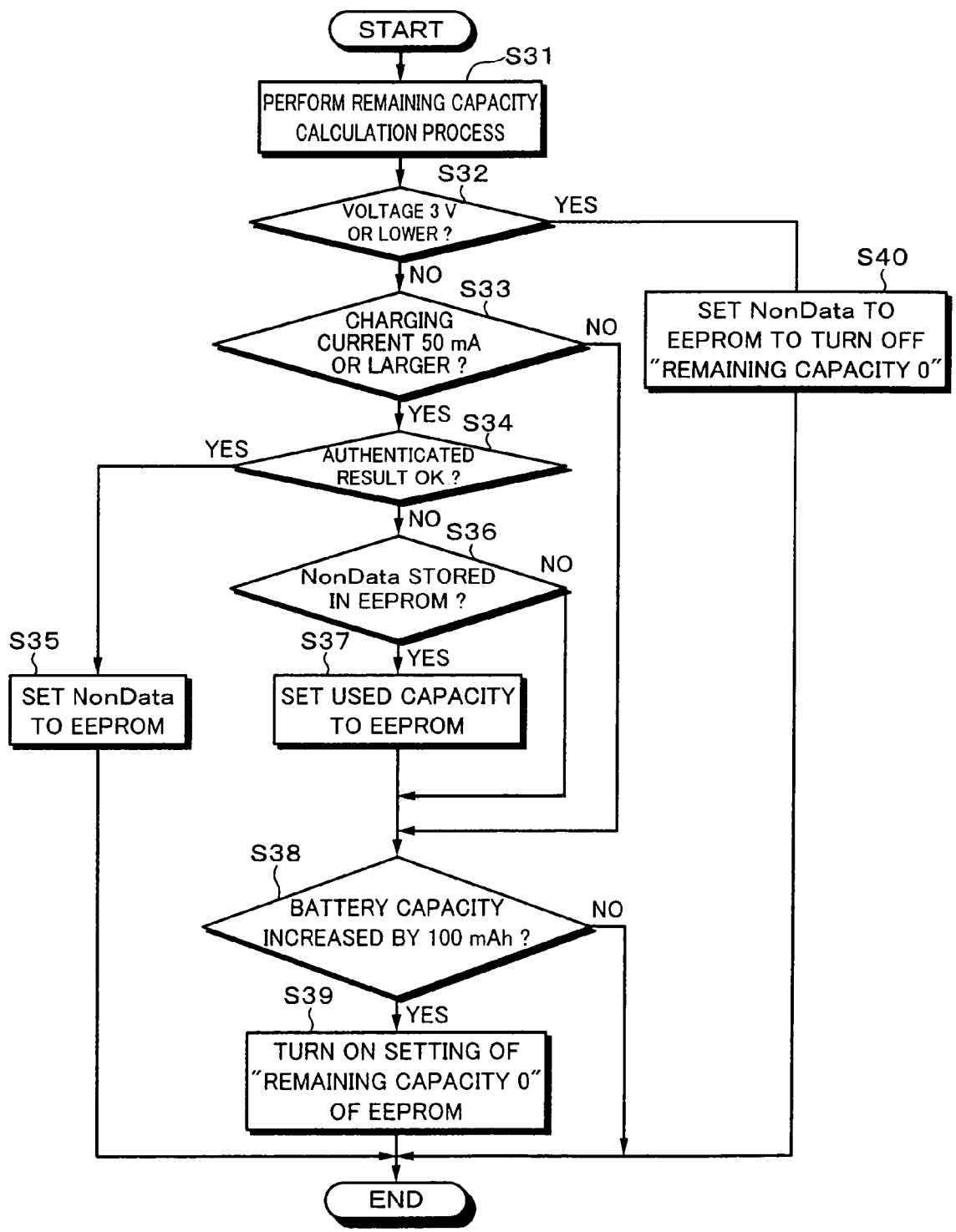
FIG. 3 is a flow chart describing a charging control method performed under the control of a microcomputer of the battery pack.

Next, with reference to a flow chart shown in FIG. 3, a process of a charging control method according to an embodiment of the present invention will be described. The charging control process is performed under the control of the microcomputer 10 of the battery pack. The process of the flow chart shown in FIG. 3 is repeated at intervals of a predetermined time period, for example 1 second. When the battery pack is attached to the charging device or an application device (this applies to the following description), the battery pack is charged.

At step S31, the remaining capacity calculation process is performed. The remaining capacity of the battery pack is calculated by for example the current cumulation method of which the current of the battery pack is measured and cumulated at intervals of a predetermined time period. At step S32, it is determined whether the voltage measured by the voltage measurement section 12 is a predetermined value or higher, for example 3 V. When the voltage is lower than 3 V, the flow advances to step S40. At step S40, the remaining capacity information stored in the EEPROM 14 are set to "no data" (NonData) to turn off "remaining capacity 0".

When the determined result at step S32 represents that the battery voltage is 3 V or higher, the flow advances to step S33. At step S33, it is determined whether the charging current is a predetermined value or larger, for example 50 mA. To prevent the battery pack from being overdischarged, it is determined whether the battery voltage is a predetermined voltage or higher. The charging current is detected to determine whether the battery pack is being charged.

When the determined result at step S33 is Yes, the flow advances to step S34. At step S34, it is determined whether the battery pack has been successfully authenticated. The foregoing authentication process is performed immediately after the battery pack is attached to the charging device.

When the battery pack has been successfully authenticated, the flow advances to step S35. At step S35, "no data" is set to the EEPROM 14. Thereafter, the process is completed. When the determined result at step S34 represents that the battery pack has not been successfully authenticated, the flow advances to step S36. At step S36, it is determined whether "no data" has been set to the EEPROM 14.

When the determined result at step 36 represents that "no data" has been set to the EEPROM 14, the flow advances to step S37. At step S37, the used capacity is set. Thereafter, at step S38, it is determined whether the battery capacity has increased by a predetermined value or larger, for example 100 mAh. When the determined result at step S33 represents that the charging current is not larger than 50 mA or when the determined result at step S36 represents that "no data" has not been set to the EEPROM 14, the flow advances to step S38.

When the determined result at step S38 represents that the battery capacity has increased by 100 mAh, it is determined that the battery pack has been improperly charged. At step S39, data that represent the remaining capacity, for example a flag that have been set to the EEPROM 14 are forcibly changed to "no remaining capacity". In this case, the "no remaining capacity" flag that represents that the battery pack has been fully discharged and the remaining capacity is zero is different data from the "no remaining capacity" flag that is forcibly set to the EEPROM 14. Since these flags are different, when the charging device or the application device receives information "no remaining capacity", a different process, for example a different indication, can be performed. When the determined result at step S38 represents that the battery capacity has not increased by 100 mAh or more, the process is completed.

When the "no remaining capacity" flag has been set, any data of "remaining capacity (mAh)", "remaining capacity ratio (%)", and "dischargeable time (minute)" sent to the application device are forcibly set to 0. When the application device has received information "remaining capacity 0", since the power is not supplied to the application device, it is incapable of operating.

When the battery pack is attached to the application device and it does not charge the battery pack, as shown in FIG. 2A, if the battery pack is charged by the charging device, information "remaining capacity 0" is written to the EEPROM 14 of the battery pack by the foregoing process. Thus, even if the battery pack is detached from the charging device and attached to the application device, since the application device recognizes that the remaining capacity of the battery pack is 0, the application device is incapable of operating.

Next, examples of steps S37 and S38 will be described. It is assumed that the capacity of the battery pack is for example 1800 mAh, namely the battery pack has been fully charged, in other words, the used capacity of the battery pack is 0 mAh and the remaining capacity ratio thereof is 100%. At step S37, the present used capacity, for example 900 mAh, is set to the EEPROM 14. At step S38, it is determined whether the battery capacity has increased by 100 mAh. In other words, it is determined whether the used capacity is 800 mAh or smaller. When the determined result represents that the used capacity is 800 mA or lower, it is determined that the battery pack have been improperly charged and the "no remaining capacity" flag is set to the EEPROM 14.

Thus, when the battery voltage of the battery pack that has been forcibly set to "no remaining capacity" becomes 3 V or lower, "remaining capacity 0" is cancelled and the battery pack can be used.

Figure 4A:
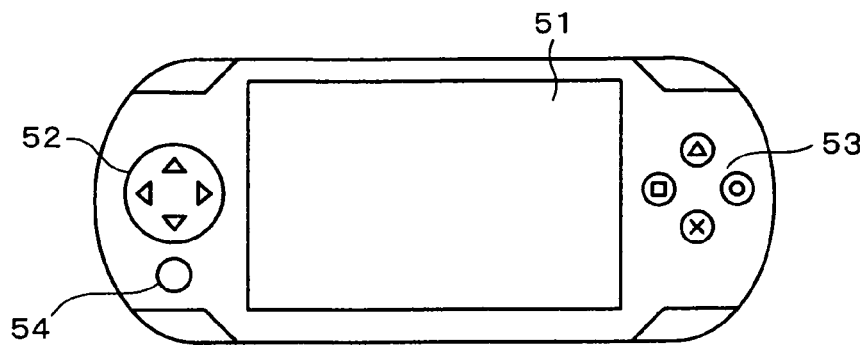
FIG. 4A, FIG. 4B, FIG. 4C, and FIG. 4D are schematic diagrams describing an example of a portable gaming device according to an embodiment of the present invention.

An embodiment of the present invention can be applied to various application devices. Next, with reference to FIG. 4A, FIG. 4B, FIG. 4C, and FIG. 4D, the case that the application device is a portable gaming device will be described. FIG. 4A is a front view showing the portable gaming device. Disposed at a center portion of the portable gaming device is a wide liquid crystal display section 51. Disposed on the left and right of the wide liquid crystal display section 51 are operation keys 52 and 53. The user can enjoy a game by operating the operation keys 52 and 53 while watching the liquid crystal display section 51. As another operation key, an analog pad 54 is also disposed.

Figure 4B:
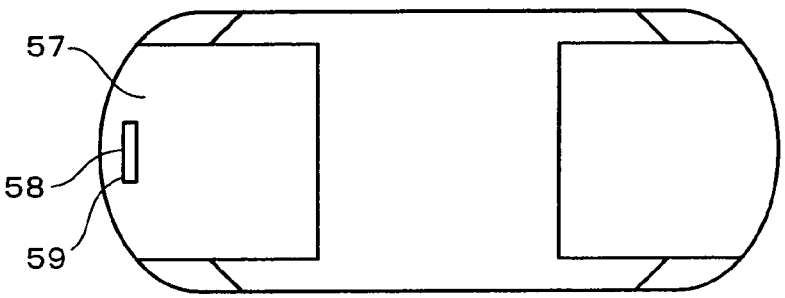
Figure 4C:
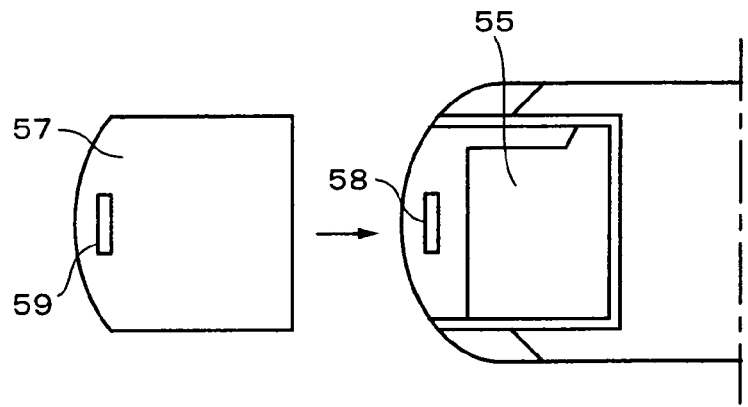

FIG. 4B is a rear view showing the portable gaming device. As shown in FIG. 4C, a battery pack housing section 55 is disposed in the rear of the portable gaming device. A battery pack 56 is accommodated in the housing section 55. A battery lid 57 slidably covers the housing section 55. A protrusion 58 that protrudes from the main body of the portable gaming device is inserted into a hole 59 formed in the battery lid 57 so that the battery lid 57 is locked and closed.

Figure 4D:
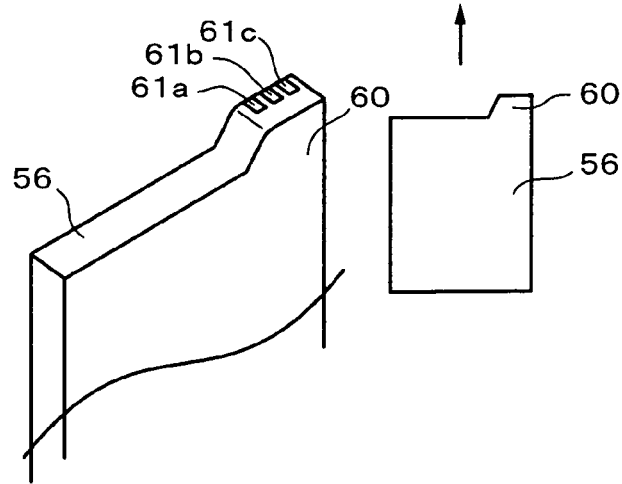

As shown in FIG. 4D, connection terminals 61a, 61b, and 61c are disposed on an edge portion 60 of the protrusion portion 60 of the battery pack 56. The connection terminals 61a, 61b, and 61c correspond to the terminals 2, 3, and 4 shown in FIG. 1, respectively.

The portable gaming device shown in FIG. 4A to FIG. 4D have various functions such as an optical disc recording/reproducing function, a wireless LAN connection function, a USB interface function, and a memory card interface function. In addition, the portable gaming device has keys other than those shown in FIG. 4A, connection portions, and so forth. Since these functions do not relate to an embodiment of the present invention, their description will be omitted. Of course, an embodiment of the present invention can be applied to various application devices such as a digital video camera, a digital camera, a personal digital assistant (PDA), and a cellular phone.

An embodiment of the present invention may be applied to a battery pack having a plurality of secondary batteries and a battery pack having a structure of which a charging control FET and a discharging control FET are connected to the positive electrode. In addition, the remaining capacity calculation method may be other than the current cumulation method.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery pack having a secondary battery and a circuit that controls charging and discharging of the secondary battery, the battery pack comprising:
   a computer that communicates with another computer disposed in a charging device, authenticates the charging device, and calculates remaining capacity information of the secondary battery,
   wherein when the computer has not successfully authenticated the charging device and has detected that the secondary battery has been charged in a predetermined manner, the computer forcibly sets the remaining capacity information to no remaining capacity,
   wherein when the voltage of the secondary battery drops to a predetermined value or lower, the setting of the no remaining capacity is cancelled.

2. The battery pack as set forth in claim 1,
   wherein when the battery pack is attached to the charging device, the computer authenticates the charging device.

3. The battery pack as set forth in claim 1,
   wherein when the computer has detected that the battery capacity has increased by a predetermined value, the computer determines that the secondary battery has been charged in the predetermined manner.

4. The battery pack as set forth in claim 1,
   wherein the remaining capacity information is stored in a nonvolatile memory.

5. The battery pack as set forth in claim 1,
   wherein a no remaining capacity that is forcibly set and a real no remaining capacity are identified by different data.

6. A charging control method of a battery pack having a secondary battery, a circuit that controls charging and discharging of the secondary battery, and a computer that calculates remaining capacity information of the secondary battery, the charging control method comprising the steps of:
   communicating with another computer disposed in a charging device and authenticating the charging device;
   detecting that the secondary battery has been charged in a predetermined manner when the charging device has not been successfully authenticated; and
   forcibly setting the remaining capacity information to a no remaining capacity when it has been detected that the secondary battery has been charged in the predetermined manner,
   wherein when the voltage of the secondary battery drops to a predetermined value or lower, the setting of the no remaining capacity is cancelled.

7. The charging control method as set forth in claim 6,
   wherein when the battery pack is attached to the charging device, it is authenticated.

8. The charging control method as set forth in claim 6,
   wherein when it has been detected that the battery capacity has increased by a predetermined value, it is determined that the secondary battery has been charged in the predetermined manner.

9. The charging control method as set forth in claim 6,
   wherein the no remaining capacity that is forcibly set and a real no remaining capacity are identified by different data.

10. An application device comprising a battery pack that is attached as a power supply, wherein the application device receives remaining capacity information from the battery pack, wherein the remaining capacity information is detected by the battery pack, and
    wherein while the battery pack is supplying a power to the application device, when the application device receives the remaining capacity information that has been forcibly set to a no remaining capacity, the application device stops operation,
    wherein when charging means determined not to be successfully authenticated has charged the battery pack, the remaining capacity information that represents a no remaining capacity is forcibly set, and
    wherein when a voltage of a secondary battery associated with the battery pack drops to a predetermined value or lower, the setting of the no remaining capacity is cancelled.

* * * * *